Patented Aug. 7, 1945

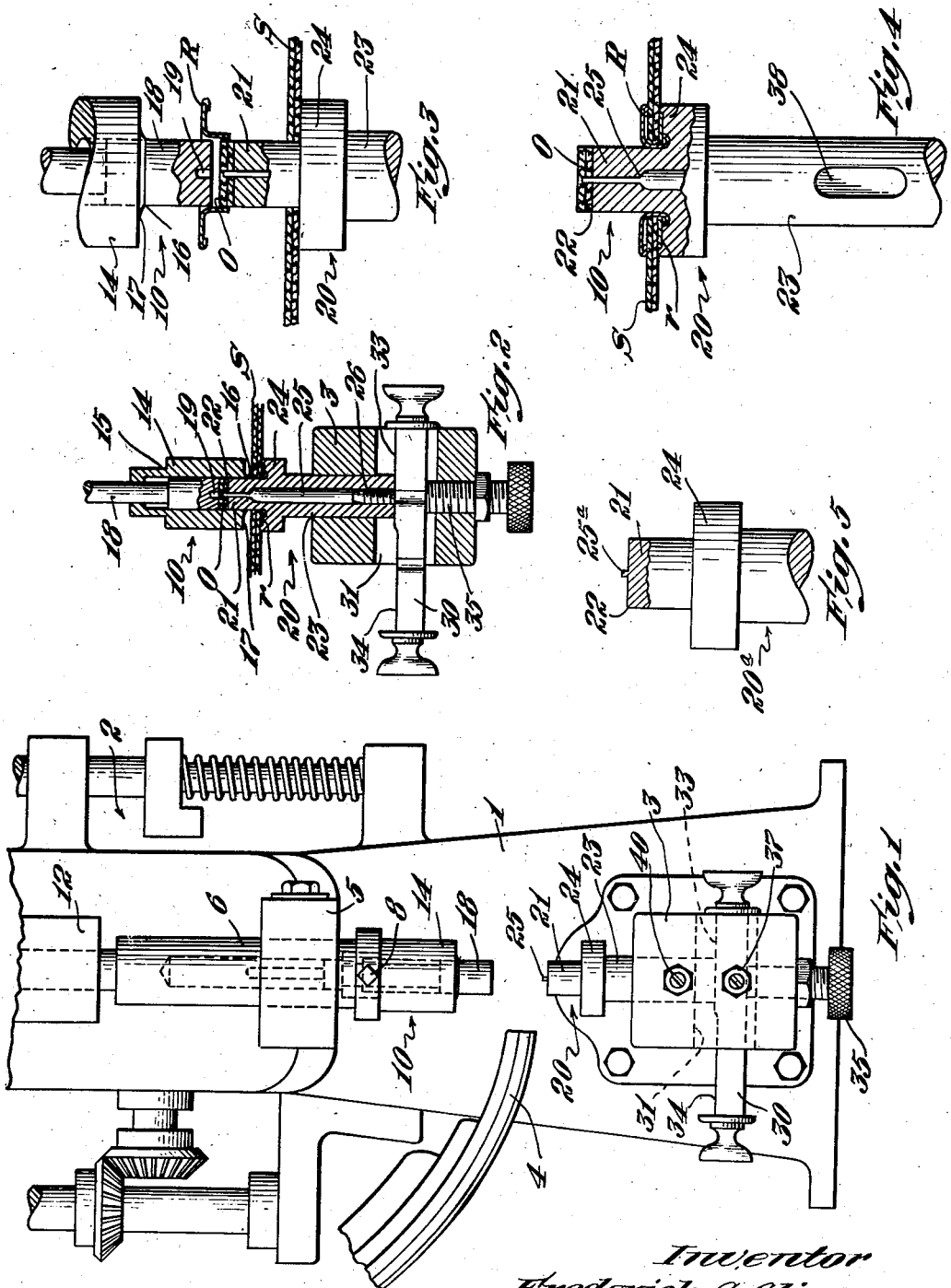

2,381,818

UNITED STATES PATENT OFFICE 2,381,818

MACHINE FOR FORMING AND REINFORCING CUTOUTS

Frederick S. Glines, East Lynn, Mass., assignor to Lorenz F. Muther, Newton Center, Mass.

Application October 17, 1942, Serial No. 462,400

2 Claims. (Cl. 218—15)

This invention relates to a machine for forming cutouts and applying a reinforcing element about the marginal portions of the cutout.

In machines of the above type it is necessary that provision be made for removing the severed material so that it will not interfere with the reinforcing operation, and although numerous attempts have been made to provide means for effectively removing the severed material, such as mechanically operated pick-offs, air blasts and the like, all such attempts so far as I am aware have not proved reliable in operation. Moreover, such devices as have been used in removing the severed material are expensive and often seriously interfere with the proper manipulation of the material operated on.

The principal objects of the present invention are to overcome the aforementioned difficulties and to provide a machine which embodies a reliable and efficient means for removably holding the severed material so that it will not interfere with the application of the reinforcement or other operations.

Further objects will be apparent from a consideration of the following description and the accompanying drawing, wherein:

Fig. 1 is an elevation of the operative parts of a machine embodying the present invention;

Fig. 2 is a vertical section through the operating instrumentalities and associated parts, illustrating their mode of operation during the first operating cycle;

Figs. 3 and 4 are enlarged elevations, with parts shown in section, illustrating the second or final operating cycle; and Fig. 5 is an enlarged elevation, with parts shown in section, illustrating a modified construction.

The particular embodiment chosen for illustration is designed for punching out openings in sheet material, such as canvas, duck, etc., during the first operating cycle of the machine, and automatically applying to and clenching a reinforcing element about the marginal portion of the cutout during the second operating cycle, it being understood that the invention is not limited to the particular type of machine herein shown, since the operating instrumentalities may be used with any machine or device capable of actuating the punching members to form an opening in sheet material to which a reinforcement is to be subsequently applied.

The machine herein shown comprises an upstanding frame 1 having an operating head 2, a work-supporting arm 3 disposed below the head 2, and a chute 4 for automatically feeding reinforcing elements such as grommets R (Fig. 3) into position to be acted upon by the operating instrumentalities. The head 2 comprises a fixed supporting arm 5 in which is mounted a reciprocating holder 6 for receiving one of the operating instrumentalities or parts 10, and the work-supporting arm 3 is designed to receive the other operating part 20. The head 2 also includes an actuating arm 12 adapted to reciprocate the holder 6 in the manner hereinafter described. The arm 12 is operated by a mechanism (not shown) which includes a two-revolution clutch and associated parts effective to reciprocate the arm 12 through two operating cycles, the first operating cycle causing a predetermined downward stroke of holder 6 and the second operating cycle effecting another downward stroke of the same magnitude. The chute 4 is associated with mechanism (not shown) which is operative to feed grommets or the like reinforcing elements R into position between the first and second operating cycles. Since this type of machine is well known in the art, a further description is unnecessary.

The operating instrumentality 10 comprises a cylindrical female punch member 14 shouldered at its upper end 15 and having its lower end formed with a cutting edge 16 and a curved convexed clenching surface 17 which provides one of a pair of clenching dies. A spring pressed plunger 18 is slidably mounted within the bore of the punch 14 with its upper end projecting through an opening therein, as shown in Fig. 2, and provided with a lug or collar (not shown) for limiting its downward movement. The lower end of the plunger normally projects downwardly below the punch 14, as shown in Figs. 1 and 3, to provide a pilot for holding a grommet R correctly positioned at the commencement of the second operating cycle. The lower face of the pilot is formed with a recess or opening 19 so as to accommodate the end of a holding pin associated with the male punch hereinafter described. The assemblage fits into the holder 6, being held in place by a set screw 8 which engages the shouldered end 15 of the punch, as shown in Fig. 1.

The operating parts 20 comprise a cylindrical male punch member 21 having an operating surface defining a cutting edge 22 which cooperates with that of the female punch member to cut a circular opening in the sheet material operated upon. The punch member 21 is provided with an elongate extension 23, and both parts are formed with an axial bore, the upper end of which is of bottleneck cross-section and its lower end screw-threaded. An annular clenching die 24, integral with and spaced below the cutting end of the punch 21, is shaped to receive a washer or reinforcing ring r and to cooperate with the clenching surface 17 of the punch 14 so as to roll the end of the grommet R over the body of the washer r, as illustrated in Fig. 4. A holding pin 25 having a tapered end is mounted in the bore of the member 21 so that its tapered end projects above the operating surface of the punch, and a screw 26 (Fig. 2) adjustably holds the pin in fixed position within the bore.

In place of the adjustable holding pin 25, the upper face of the punch member 21 may be formed with an integral pin 25ᵃ, as shown in Fig. 5, in which case the pin 25ᵃ projects beyond the cutting edges 22 an amount approximately equal to the thickness of the material to be operated upon.

The extension 23 slidably fits within an opening in the support 3 with the punch 21 operatively positioned with respect to the punch 14 and chute 4. The lower end of the extension 23 is supported on a slide 30 mounted in a horizontal slot 31 formed in the support 3. The slide 30 is formed with stepped surfaces 33 and 34 (Figs. 1 and 2) interconnected by a beveled portion, and these surfaces provide two supporting levels for the parts 10, the difference in the supporting levels being such as to compensate for the differences in thicknesses of the sheet material S to be operated upon. The slide 30 is mounted for vertical movement in the slot 31, being supported at a predetermined height in the slot by a thumbscrew 35, as shown in Figs. 1 and 2. By moving the slide from left to right, the level at which the parts 10 are supported may be lowered so as to accommodate a greater thickness of sheet material, thus avoiding the necessity for making readjustments of the operating parts. The slide 30 is held in one position or the other by a spring-pressed plunger (not shown) associated with a set screw 37, and in order to prevent rotation of the parts 20 on the slide, the extension 23 is formed with a slot 38 which receives the end of a set screw 40 (Fig. 1).

The operation of the machine is as follows:

Assuming that both the operating parts 10 and 20 are correctly positioned, that the slide 30 is adjusted to maintain the parts 20 at the proper operating level for a given thickness of sheet material S to be operated upon, that the holding pin 25 is properly adjusted to penetrate the sheet material, and that chute 4 is filled with grommets R and correctly positioned to feed them one at a time—a washer r is first manually applied about the punch 21 and the sheet material is then held in position on the punch, whereupon the treadle or operating lever of the machine is actuated. During the first stroke or operating cycle, the punch 14 and pilot 18 are carried downwardly a distance sufficient to cut through the sheet material S and simultaneously cause the holding pin 25 to penetrate and releasably hold the severed material or cutout O, as shown in Fig. 2, and as the punch 14 begins its upward movement, the pilot 18 operates to hold the cutout O on the male punch 21 until the punch 14 is clear of the cut-out, thereby preventing removal of the cut-out from the top of punch 21, after which the pilot 18 is carried upwardly leaving the severed material O held in place on the upper face of the male punch 21. During this cycle the holding pin 25 may penetrate through the cutout O, in which case its end is received by the recess 19 and hence is not damaged. At the end of the first cycle the plunger 14 and pilot 18 are in elevated position, as shown in Fig. 1, and at the beginning of the second stroke or operating cycle the feeding mechanism operates to swing chute 4 inwardly so as to position a grommet R in the downward path of travel of the pilot 18. During the first part of the second cycle the pilot 18 first engages the grommet and as the pilot 18 and associated parts continue their downward movement, the chute 4 is retracted so that the grommet R is carried downwardly by the pilot 18 about the punch 21 and cut-out O on its end, as illustrated in Fig. 3. Continued downward movement of the parts 14—18 forces the body of the grommet R through the opening in the sheet S and the opening in the washer r so that its lower end is rolled over the washer r by the cooperative action of the surface 17 and the die 24, as illustrated in Fig. 4, whereupon the parts are returned to their original position (Fig. 1). The punched sheet with its reinforcement is then stripped from the male punch 21, and as the sheet is being removed, the cutout O is replaced in the opening due to engagement with the grommet R and is thus removed from the punch and carried away from the operating area, where it may later be pushed or blown out. The severed material is thus effectively removed to a point remote from the area of operation, where it can not interfere with subsequent operations.

While I have shown and described one desirable embodiment of the invention, it is to be understood that this disclosure is for the purpose of illustration, and that various changes in shape, proportion and arrangement of parts, as well as the substitution of equivalent elements for those herein shown and described, may be made without departing from the spirit and scope of the invention as set forth in the appended claims.

I claim:

1. In a machine of the class described having mechanism for effecting a two-cycle operation, operating instrumentalities comprising cooperating male and female punch members for forming a cut-out in a piece of sheet material during one operating cycle, a depressible pilot associated with the female member, said pilot normally projecting beyond the cutting edge of said female member and being movable toward and away from the male member, cooperating dies circumposed about said punch members operative during the second operating cycle to clench an annular shaped reinforcement about the marginal portions of the cut-out formed by said punch members, said male member having a holding pin projecting from its upper surface and said pilot having a recess to receive the end of said pin, said pin cooperating with said pilot so as to penetrate said sheet material during the first operating cycle, thereby releasably to hold the severed material in position on said male member during the second operating cycle, but effective to permit said severed material to be replaced in the opening of the reinforcement applied to said cut-out when the sheet material is removed from the area of operation of said instrumentalities.

2. In a machine of the class described having mechanism for effecting a two-cycle operation, operating instrumentalities comprising a male punch member formed with an axial opening, a female punch member cooperatively associated with the male punch member so as to punch an opening in a piece of sheet material during the first operating cycle, a depressible pilot telescopically disposed within said female punch member and normally projecting beyond its cutting edge, a clenching die surrounding said male member, means associated with the female member to provide a clenching surface cooperating with said die to secure a reinforcing element about the marginal portion of the opening in said sheet material during the second operating cycle, a holding finger adjustably mounted in the opening in said male member with its end projecting above the surface thereof, said pilot having a recess in its outer end to receive the projecting end of said holding finger, said pilot and projecting end of said holding finger being arranged to cooperate so that said holding finger penetrates said sheet material during the first operating cycle, thereby releasably to hold the severed material in position on the male punching member during the second operating cycle, but effective to permit the severed material to be replaced in the opening in said reinforcing element after application to said cut-out when the sheet material is removed from the area of operation of said instrumentalities.

FREDERICK S. GLINES.